(12) United States Patent
Yin

(10) Patent No.: US 12,032,244 B1
(45) Date of Patent: Jul. 9, 2024

(54) LIGHT DIFFUSION FILM, POLARIZER, AND LIQUID CRYSTAL DISPLAY DEVICE

(71) Applicant: TCL CHINA STAR OPTOELECTRONICS TECHNOLOGY CO., LTD., Guangdong (CN)

(72) Inventor: Hongshan Yin, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 18/263,536

(22) PCT Filed: Jun. 5, 2023

(86) PCT No.: PCT/CN2023/098322
§ 371 (c)(1),
(2) Date: Jul. 30, 2023

(30) Foreign Application Priority Data

Apr. 13, 2023 (CN) .......................... 202310394606.7

(51) Int. Cl.
*G02F 1/13363* (2006.01)
*G02B 5/02* (2006.01)
*G02F 1/1335* (2006.01)

(52) U.S. Cl.
CPC ..... *G02F 1/133635* (2021.01); *G02B 5/0242* (2013.01); *G02F 1/133507* (2021.01)

(58) Field of Classification Search
None
See application file for complete search history.

(56) References Cited

U.S. PATENT DOCUMENTS

| | | | | |
|---|---|---|---|---|
| 9,328,879 | B2* | 5/2016 | Wang | F21V 3/12 |
| 9,945,989 | B2* | 4/2018 | Setz | C03C 8/22 |
| 2002/0009573 | A1 | 1/2002 | Kimura et al. | |
| 2006/0209403 | A1 | 9/2006 | Parusel et al. | |
| 2009/0279175 | A1 | 11/2009 | Laney et al. | |

(Continued)

FOREIGN PATENT DOCUMENTS

| | | |
|---|---|---|
| CN | 105163937 A | 12/2015 |
| CN | 107405869 A | 11/2017 |

(Continued)

OTHER PUBLICATIONS

CNIPA, Notification of First Office Action for Chinese application CN202310394606.7, May 20, 2023.

(Continued)

*Primary Examiner* — Ashok Patel
(74) *Attorney, Agent, or Firm* — PV IP PC; Zhigang Ma; Wei Te Chung

(57) ABSTRACT

The present disclosure discloses a light diffusion film, a polarizer including the light diffusion film, and a liquid crystal display device. A plurality of first particles and a plurality of second particles disposed in the resin layer of the light diffusion film. Each of the first particles has a diameter remaining unchanged in a longitudinal direction of the first particles. Each of the second particles includes a first end portion and a second end portion in a longitudinal direction thereof, and a diameter of the first end portion decreases progressively in a direction away from the second end portion.

17 Claims, 11 Drawing Sheets

(56) References Cited

U.S. PATENT DOCUMENTS

2013/0242605 A1  9/2013  Zhao et al.
2016/0011339 A1  1/2016  Namikawa

FOREIGN PATENT DOCUMENTS

| | | |
|---|---|---|
| CN | 207586456 U | 7/2018 |
| CN | 111443403 A | 7/2020 |
| CN | 211180274 U | 8/2020 |
| CN | 114509841 A | 5/2022 |
| CN | 115508926 A | 12/2022 |
| CN | 115685429 A | 2/2023 |
| CN | 115712213 A | 2/2023 |
| CN | 116106999 A | 5/2023 |
| CN | 116107012 A | 5/2023 |
| CN | 116125582 A | 5/2023 |
| JP | H11194204 A | 7/1999 |
| JP | 2004326005 A | 11/2004 |
| JP | 2009217156 A | 9/2009 |
| JP | 2012208428 A | 10/2012 |
| JP | 2016028272 A | 2/2016 |
| KR | 100497280 B1 | 7/2005 |
| KR | 20110078332 A | 7/2011 |
| KR | 20180122511 A | 11/2018 |

OTHER PUBLICATIONS

CNIPA, Notification to grant patent right for Chinese application CN202310394606.7, Jun. 14, 2023.
Chinese Office Action issued in corresponding Chinese Patent Application No. 202310394606.7 dated May 20, 2023, pp. 1-8.
International Search Report in International application No. PCT/CN2023/098322, mailed on Dec. 21, 2023.
Written Opinion of the International Search Authority in International application No. PCT/CN2023/098322, mailed on Dec. 21, 2023.
Korean Office Action issued in corresponding Korean Patent Application No. 10-2023-7026089 dated Nov. 28, 2023, pp. 1-6.

\* cited by examiner

3

10

3

LIGHT DIFFUSION FILM, POLARIZER, AND LIQUID CRYSTAL DISPLAY DEVICE

CROSS REFERENCE

The present application is a US national phase application based upon an International Application No. PCT/CN2023/098322, filed on Jun. 5, 2023, which claims priority to Chinese Patent Application No. 202310394606.7, filed on Apr. 13, 2023, and entitled "LIGHT DIFFUSION FILM, POLARIZER, AND LIQUID CRYSTAL DISPLAY DEVICE", the disclosure of which is incorporated herein by reference in its entirety.

TECHNICAL FIELD

The present disclosure relates to the field of display, and in particular, to a light diffusion film, a polarizer, and a liquid crystal display device.

BACKGROUND OF INVENTION

With the development of liquid crystal display technology, liquid crystal display panels tend to larger in size and larger in chromaticity viewing angle. In order to expend the chromaticity viewing angle of a liquid crystal display panel, a light diffusion film and a light intensity compensation film are usually attached to a liquid crystal display screen, so that the light of the liquid crystal display panel is uniformly diffused and the light intensity at certain angles is compensated. However, the contrast of the liquid crystal display panel can be affected, for example, the contrast of the liquid crystal display panel can be reduced by attaching the light-diffusing film onto the liquid crystal display screen.

In order to expand the viewing angle of the liquid crystal display panel so as to adapt to a large screen, and to avoid effects on the contrast of the liquid crystal display panel, it is necessary to propose a new light diffusion film, a polarizer, and a liquid crystal display device, which can improve the problem of a decrease in the contrast of the liquid crystal display panel under a large viewing angle.

Technical Problems

An object of the present disclosure is to provide a light diffusion film, a polarizer, and a liquid crystal display device, which can improve the problem of a decrease in the contrast of the liquid crystal display panel with a large size and a large viewing angle, and improve display quality.

Technical Solutions

To solve the above technical problem, the present disclosure provides alight diffusion film including a resin layer, a plurality of first particles and a plurality of second particles disposed in the resin layer. Each of the plurality of first particles has a diameter remaining unchanged in a longitudinal direction of the plurality of first particles. Each of the plurality of second particles includes a first end portion and a second end portion in a longitudinal direction thereof, and a diameter of the first end portion decreases progressively in a direction away from the second end portion.

In the light diffusion film provided by an embodiment of the present disclosure, a diameter of each of the plurality of second particles decreases progressively in a direction from the second end portion to the first end portion.

In the light diffusion film provided by an embodiment of the present disclosure, a diameter of the second end portion decreases progressively in a direction away from the first end portion.

In the light diffusion film provided by an embodiment of the present disclosure, each of the plurality of second particles further includes an intermediate portion, and the first end portion, the intermediate portion, and the second end portion are sequentially connected.

In a longitudinal direction of the plurality of second particles, a diameter of the intermediate portion remains unchanged, and a diameter of the second end portion decreases progressively in a direction away from the first end portion.

In the light diffusion film provided by an embodiment of the present disclosure, each of the plurality of second particles further includes an intermediate portion, and the first end portion, the intermediate portion, and the second end portion are sequentially connected.

In a longitudinal direction of the plurality of second particles, a diameter of the intermediate portion remains unchanged, and a diameter of the second end portion remains unchanged.

In the light diffusion film provided by an embodiment of the present disclosure, each of the plurality of first particles has a diameter ranging from 0.008 microns to 12.4 microns, each of the plurality of second particles has a maximum diameter of 12.4 microns, and each of the plurality of second particles has a minimum diameter of 0.008 microns.

In the light diffusion film provided by an embodiment of the present disclosure, a ratio of a mass of all the plurality of first particles to a mass of all the plurality of second particles is (1 to 10):(90 to 99).

In the light diffusion film provided by an embodiment of the present disclosure, a sum of a mass of the plurality of first particles and a mass of the plurality of second particles accounts for 10% of a mass of the light diffusion film.

The plurality of second particles include a first type of particles and a second type of particles, each of the first type of particles includes a first end portion and a second end portion in a longitudinal direction thereof, and each of the second type of particles includes a first end portion and a second end portion in a longitudinal direction thereof.

A diameter of each of the first type of particles decreases progressively in a direction from the second end portion of the first type of particles to the first end portion of the first type of particles.

A diameter of the second end portion of the second type of particles decreases progressively in a direction away from the first end portion of the second type of particles.

A ratio of a mass of all the plurality of first particles, a mass of all the first type of particles and a mass of all the second type of particles is (1 to 10):(40 to 70):(20 to 60).

In the light diffusion film provided by an embodiment of the present disclosure, a sum of a mass of the plurality of first particles and a mass of the plurality of second particles accounts for 10% of a mass of the light diffusion film.

The plurality of second particles include a first type of particles and a second type of particles, each of the first type of particles includes a first end portion and a second end portion in a longitudinal direction thereof, and each of the second type of particles includes a first end portion and a second end portion in a longitudinal direction thereof.

A diameter of each of the first type of particles decreases progressively in a direction from the second end portion of the first type of particles to the first end portion of the first type of particles.

Each of the second type of particles further includes an intermediate portion, and the first end portion of the second type of particles, the intermediate portion of the second type of particles, and the second end portion of the second type of particles are sequentially connected. A diameter of the intermediate portion of the second type of particles remains unchanged in a longitudinal direction of the second type of particles, and a diameter of the second end portion of the second type of particles decreases progressively in a direction away from the first end portion of the second type of particles.

A ratio of a mass of all the plurality of first particles, a mass of all the first type of particles and a mass of all the second type of particles is (1 to 10):(40 to 70):(20 to 60).

In the light diffusion film provided by an embodiment of the present disclosure, each of the plurality of first particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of first particles is one or more organic particles selected from polymethylmethacrylate particles, polystyrene particles, polycarbonate particles, silicone elastomer particles, butyl acrylate-styrene particles, and poly (methyl 4-hydroxybenzoate) particles.

Each of the plurality of second particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of second particles is one or more organic particles selected from polymethylmethacrylate particles, polystyrene particles, polycarbonate particles, silicone elastomer particles, butyl acrylate-styrene particles, and poly (methyl 4-hydroxybenzoate) particles.

The present disclosure further provides a polarizer including any of the light diffusion films as described above. The polarizer further includes a substrate, a polarizing functional layer, and a hard coating. The substrate is disposed between the polarizing functional layer and the hard coating. The resin layer is any one of the substrate, the polarizing functional layer and the hard coating.

In the polarizer provided by an embodiment of the present disclosure, the plurality of first particles and the plurality of second particles are directionally disposed in the resin layer. An included angle between a longitudinal direction of the plurality of first particles and an absorption axis of the polarizing functional layer ranges from −10 degrees to 10 degrees. An included angle between a longitudinal direction of the plurality of second particles and absorption axis of the polarizing functional layer ranges from −10 degrees to 10 degrees.

In the polarizer provided by an embodiment of the present disclosure, a diameter of each of the plurality of second particles decreases progressively in a direction from the second end portion to the first end portion.

In the polarizer provided by an embodiment of the present disclosure, a diameter of the second end portion decreases progressively in a direction away from the first end portion.

In the polarizer provided by an embodiment of the present disclosure, each of the plurality of second particles further includes a first intermediate portion, and the first end portion, the intermediate portion, and the second end portion are sequentially connected.

In a longitudinal direction of the plurality of second particles, a diameter of the first intermediate portion remains unchanged, and a diameter of the second end portion decreases progressively in a direction away from the first end portion.

In the polarizer provided by an embodiment of the present disclosure, each of the plurality of second particles further includes an intermediate portion. The first end portion, the intermediate portion, and the second end portion are sequentially connected In a longitudinal direction of the plurality of second particles, a diameter of the intermediate portion remains unchanged, and a diameter of the second end portion remains unchanged.

In the polarizer provided by an embodiment of the present disclosure, each of the plurality of first particles has a diameter ranging from 0.008 microns to 12.4 microns, each of the plurality of second particles has a maximum diameter of 12.4 microns, and each of the plurality of second particles has a minimum diameter of 0.008 microns.

In the polarizer provided by an embodiment of the present disclosure, a ratio of a mass of all the plurality of first particles to a mass of all the plurality of second particles is (1 to 10):(90 to 99).

In the polarizer provided by an embodiment of the present disclosure, a sum of amass of the plurality of first particles and a mass of the plurality of second particles accounts for 10% of a mass of the light diffusion film.

The plurality of second particles include a first type of particles and a second type of particles. Each of the first type of particles includes a first end portion and a second end portion in a longitudinal direction thereof. Each of the second type of particles includes a first end portion and a second end portion in a longitudinal direction thereof.

A diameter of each of the first type of particles decreases progressively in a direction from the second end portion of the first type of particles to the first end portion of the first type of particles.

A diameter of the second end portion of the second type of particles decreases progressively in a direction away from the first end portion of the second type of particles.

A ratio of a mass of all the plurality of first particles, a mass of all the first type of particles and a mass of all the second type of particles is (1 to 10):(40 to 70):(20 to 60).

The present disclosure further provides a liquid crystal display device including a liquid crystal display panel and any of the polarizers as described above, the polarizer is disposed at a light-emitting side of the liquid crystal display panel.

The light diffusion film includes a resin layer, a plurality of first particles and a plurality of second particles disposed in the resin layer. Each of the plurality of first particles has a diameter remaining unchanged in a longitudinal direction of the plurality of first particles. Each of the plurality of second particles includes a first end portion and a second end portion in a longitudinal direction thereof. A diameter of the first end portion decreases progressively in a direction away from the second end portion. The polarizer further includes a substrate, a polarizing functional layer, and a hard coating. The substrate is disposed between the polarizing functional layer and the hard coating. The resin layer is any one of the substrate, the polarizing functional layer and the hard coating.

Advantageous Effects

In the present disclosure, the first particles and the second particles are disposed in the resin layer of the light diffusion film, so that the light diffusion film has a scattering effect, and the display panel attached with the light diffusion film has better contrast. Each of the plurality of first particles has a diameter remaining unchanged in a longitudinal direction of the plurality of first particles. Each of the plurality of second particles includes a first end portion and a second end portion in a longitudinal direction thereof, and a diameter of the first end portion decreases progressively in a direction away from the second end portion. Both the first particles and the second particles enable the light diffusion film to have a scattering effect, and can improve the chromaticity viewing angles of a polarizer attached with the light diffusion film. Moreover, mixing of the second particles with the first particles can reduce effects on the contrast of the display panel attached with the light diffusion film, so that the display panel with the light diffusion film has better contrast.

REFERENCE SIGNS

1000, liquid crystal display device;
100, polarizer; 200, liquid crystal display panel;
10, light diffusion film; 11, release film; 12, first pressure-sensitive adhesive layer; 13, optical compensation layer; 14, polarizing functional layer; 15, first substrate; 16, second pressure-sensitive adhesive layer; 17, second substrate; 18, hard coating; 19, anti-reflective layer; 21, protective layer;
1. resin layer; 2, first particles; 3, second particles;
3a, first type of particles; 3b, second type of particles;
D1, first end portion; D2, second end portion; D3, intermediate portion.

EMBODIMENTS OF INVENTION

Hereinafter, technical solutions in embodiments of the present disclosure will be clearly and completely described with reference to the accompanying drawings in embodiments of the present disclosure. Apparently, the described embodiments comprise but are not limited to the embodiments of the present disclosure. Other embodiments that can be obtained by a person with ordinary skill in the art on the basis of the embodiments in the present disclosure without creative labor belong to the protection scope of the present disclosure.

It should be noted that in the description of the present disclosure, it should be understood that the orientations or positional relationships indicated by "above", "below", "front", "back", "left", "right", "inside" and "outside" are based on the orientations or positional relationships shown in the appended drawings, which are only for the purpose of facilitating and simplifying the description of the present disclosure, rather than indicating or implying that the apparatus or component referred to must have a particular orientation or must be configured or operated in a particular orientation, therefore should not be construed as a limitation towards the present disclosure.

Embodiments of the present disclosure provide a light diffusion film, a polarizer, and a liquid crystal display device, which are described in detail below. It should be noted that the order in which the following embodiments are described is not intended to limit the preferred order of the embodiments.

Figure 1:
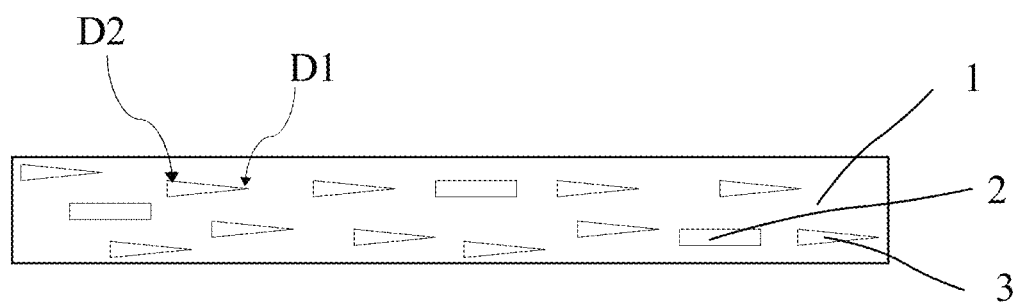
FIG. 1 is a schematic diagram of a light diffusion film in a first configuration according to embodiments of the present disclosure.
Figure 2:
FIG. 2 is a characterization diagram of first particles in alight diffusion film according to embodiments of the present disclosure.

Referring to FIGS. 1 and 2, embodiments of the present disclosure provide a light diffusion film 10 including a resin layer 1 and a plurality of first particles 2 and a plurality of second particles 3 disposed in the resin layer 1. Each of the plurality of first particles 2 has a diameter remaining unchanged in a longitudinal direction of the plurality of first particles 2. Each of the plurality of second particles 3 includes a first end portion D1 and a second end portion D2 in a longitudinal direction thereof, and a diameter of the first end portion D1 decreases progressively in a direction away from the second end portion D2.

In the present disclosure, the first particles 2 and the second particles 3 are disposed in the resin layer 1 of the light diffusion film 10, so that the light diffusion film 10 has a scattering effect, and the display panel attached with the light diffusion film 10 has better contrast. Each of the plurality of first particles 2 has a diameter remaining unchanged in a longitudinal direction of the plurality of first particles 2. Each of the plurality of second particles 3 includes a first end portion D1 and a second end portion D2 in a longitudinal direction thereof, and a diameter of the first end portion D1 decreases progressively in a direction away from the second end portion D2. Both the first particles 2 and the second particles 3 enable the light diffusion film 10 to have a scattering effect, and can improve the chromaticity viewing angles of a polarizer 100 attached with the light diffusion film 10. Moreover, mixing of the second particles 3 with the first particles 2 can reduce effects on the contrast of the display panel attached with the light diffusion film 10, so that the display panel with the light diffusion film 10 has better contrast.

It should be noted that the contrast in the present disclosure refers to the ratio of the brightness of a display panel in a white state to the brightness of a display panel in a dark state. In case that only the first particles 2 having diameters remaining unchanged are disposed in the light diffusion film 10, that is, only cylindrical particles are disposed, since the cylindrical particles have good scattering effects, in the dark state, the ambient light is scattered by the first particles 2, so that the display panel has a relatively large brightness; while in the white state, light emitted by a light-emitting unit is scattered by the first particles 2, and the brightness of the display panel is uniformly diffused, so that the brightness is relatively small. As a result, the contrast of the display panel significantly decreases. The second particles 3, whose diameters are decreasing progressively in a direction away from the second end portion D2, has a weaker scattering effect than that the first particles 2. By disposing both the first particles 2 and the second particles 3 in the light diffusion film 10, in the dark state, the ambient light is scattered by the mixed particles, so that the display panel has a relatively small brightness, while in the white state, light emitted by the light-emitting unit is scattered by the mixed particles, so that the display panel has a relatively large brightness. As a result, the light diffusion film 10 has a scattering effect, and the contrast of the display panel attached with the light diffusion film 10 is less affected, leading to better contrast.

In addition, in case that only first particles 2 having diameters remaining unchanged are disposed in the light diffusion film 10, that is, only cylindrical particles are disposed, transmittance of the light diffusion film 10 is slightly lower than that including both the first particles 2 and the second particles 3.

Optionally, the resin layer 1 has a thickness of greater than 3 microns and less than 50 microns. Specifically, the thickness of the resin layer 1 can be 4 microns, 5 microns, 6 microns, 10 microns, 12 microns, 15 microns, 17 microns, 18 microns, 20 microns, 24 microns, 25 microns, 26 microns, 30 microns, 33 microns, 35 microns, 38 microns, 40 microns, 45 microns, or 48 microns.

Optionally, both the first particles 2 and the second particles 3 may be inorganic particles, such as one or more selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles. Both the first particles 2 and the second particles 3 may also be organic particles, such as one or more selected from polymethylmethacrylate particles, polystyrene particles, polycarbonate particles, silicone elastomer particles, butyl acrylate-styrene particles, and poly (methyl 4-hydroxybenzoate) particles.

Figure 3:
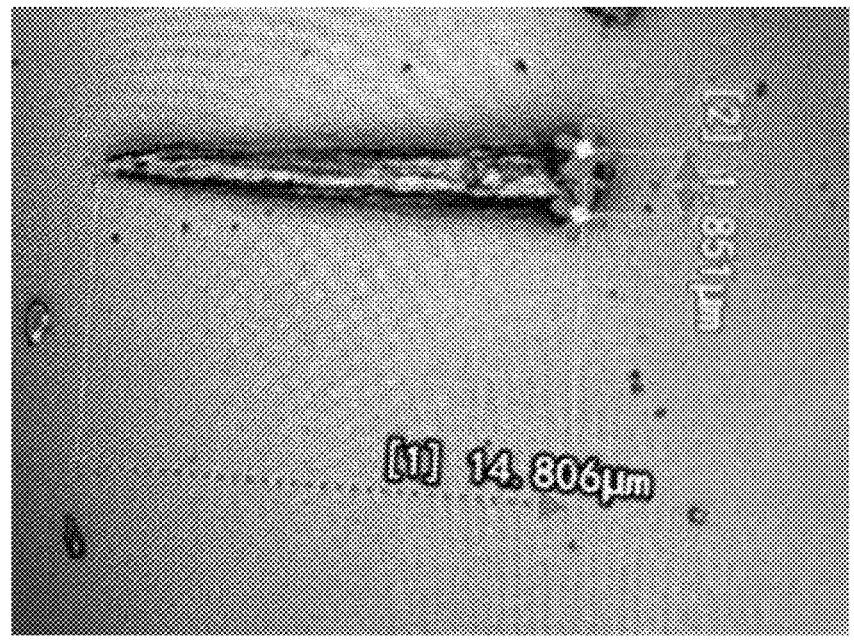
FIG. 3 is a characterization diagram of a first kind of second particles in a light diffusion film according to embodiments of the present disclosure.

Referring to FIG. 3, in this embodiment, a diameter of each of the second particles 3 decreases progressively in a direction from the second end portion D2 to the first end portion D1. That is, each of the second particles 3 has a long cone shape.

It can be understood that the scattering effect of the second particles 3 with long cone shape is weaker than that of the first particles 2. By mixing the second particles 3 and the first particles 2 in the resin layer 1, the light diffusion film 10 has a scattering effect while the contrast of the display panel attached with the light diffusion film 10 is less affected, thus having better contrast.

In this embodiment, each of the first particles 2 has a diameter ranging from 0.008 microns to 12.4 microns. Each of the second particles has a maximum diameter of 12.4 microns, and each of the second particles has a minimum diameter of 0.008 microns.

Specifically, the diameter of each of the first particles 2 may be 0.008 microns, 0.01 microns, 0.05 microns, 0.1 microns, 0.5 microns, 1 micron, 1.4 microns, 2 microns, 2.5 microns, 3 microns, 3.6 microns, 5 microns, 5.7 microns, 6 microns, 8 microns, 9 microns, 10 microns, 11 microns, 12 microns, 12.4 microns, or the like. It is easy to understand that each of the first particles 2 has a diameter remaining unchanged in its longitudinal direction, i.e. the first particles 2 has the same diameter everywhere in its longitudinal direction, means that a diameter deviation of each of the cylindrical particles is within ±20%. For example, when referring that the diameter of each first particle 2 is 1 micron, since there is a diameter deviation of 20%, the diameter ranges from 0.8 microns to 1.2 microns.

The maximum diameter of each second particle 3 may be 0.5 microns, 1 micron, 1.4 microns, 2 microns, 2.5 microns, 3 microns, 3.6 microns, 5 microns, 5.7 microns, 6 microns, 8 microns, 9 microns, 10 microns, 11 microns, 12 microns, 12.4 microns, or the like. The minimum diameter of each second particle 3 may be 0.008 microns, 0.01 microns, 0.05 microns, 0.1 microns, 0.5 microns, 1 micron, 1.4 microns, 2 microns, 2.5 microns, 3 microns, 3.6 microns, 5 microns, 5.7 microns, 6 microns, 8 microns, 9 microns, 10 microns, or the like. It is easy to understand that the maximum diameter of each second particle 3 is greater than the minimum diameter.

Optionally, a ratio of the length to the radius of a particle is greater than 1. Specifically, the ratio of the length to the radius of a particle may be 1.5, 2, 2.5, 3, 5, or the like.

In the present disclosure, by setting the diameter of each first particle 2 to be from 0.008 microns to 12.4 microns, the maximum diameter of each second particle 3 to be 12.4 microns, and the minimum diameter of each second particle 3 to be 0.008 microns, light passing through the light diffusion film 10 can be subjected to Mie scattering, thus having better scattering effect. Further, the chromaticity viewing angle is improved when the light diffusion film 10 is attached to the display panel.

Specifically, scattering includes Mie scattering and Rayleigh scattering. Mie scattering means that when light hits particles with a diameter equal to or larger than the wavelength of light, the light mainly scatters along the original traveling direction. That is, the light intensity scattered along the direction in which light travels is greater than the light intensity scattered in the reverse direction in which the ray travels. Rayleigh scattered light is more uniformly in the direction in which the ray travels and in the reverse direction in which the ray travels. That is, along the direction in which the light travels, the intensity of Rayleigh scattering is less than that of Mie scattering. The Mie scattering of the light passing through the light diffusion film 10 can achieve a better scattering effect and reduce light loss.

Figure 4:
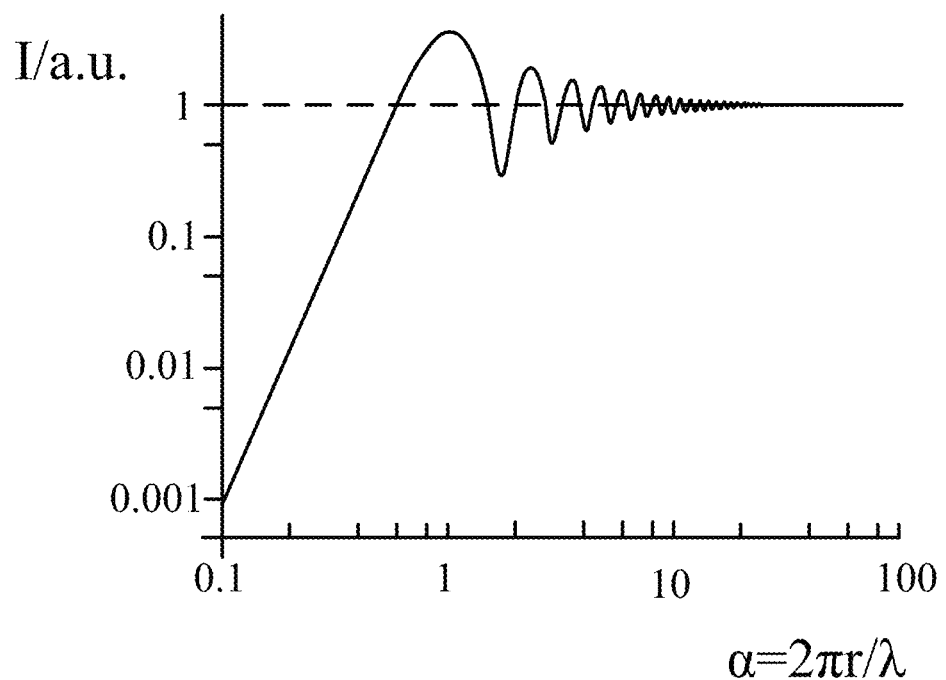
FIG. 4 is a schematic diagram of the relationship between light scattering intensity and dimensionless numbers.

Mie scattering and Rayleigh scattering are generally distinguished by the size of light and particles, and different processing methods are adopted according to the relative size of particles and the wavelength of light. In the present disclosure, a dimensionless number is used as a criterion, and which is a function of the ratio of particle radius to radiation wavelength, and the formula is: $\alpha=2\pi r/\lambda$. $\alpha$ is a dimensionless number, r is particle radius, and $\lambda$ is the wavelength of light. When the diameter of a particle ranges from 0.008 microns to 12.4 microns, that is, the radius of the particle ranges from 0.004 microns to 6.2 microns, the dimensionless number a is greater than or equal to 0.1, and a is less than 50. That is, when the dimensionless number a is within this range, light is subjected to Mie scattering. When the dimensionless number a is much less than 0.1, light is subjected to Rayleigh scattering. The change of scattering intensity is a function of the ratio of particle radius to radiation wavelength. Referring to FIG. 4, which is a schematic diagram of the relationship between scattering intensity and dimensionless numbers, wherein the abscissa is the dimensionless number a, and the ordinate is the scattering intensity I. In case that the dimensionless number a is greater than or equal to 0.1, the intensity I of light scattering increases with the increase of the dimensionless number a, and finally stabilizes around I.

In this embodiment, a ratio of a mass of all the plurality of first particles 2 to a mass of all the plurality of second particles 3 is (1 to 10):(90 to 99). Specifically, the ratio of the mass of all the first particles 2 to the mass of all the second particles 3 may be 1:99, 2:98, 3:97, 4:96, 5:95, 6:94, 7:93, 8:92, 9:91 or 10:90.

It can be understood that if the mass ratio of the first particles 2 to the second particles 3 is within this range, the chromaticity viewing angle and the contrast can be larger when the light diffusion film 10 is attached onto the display panel.

Figure 5:
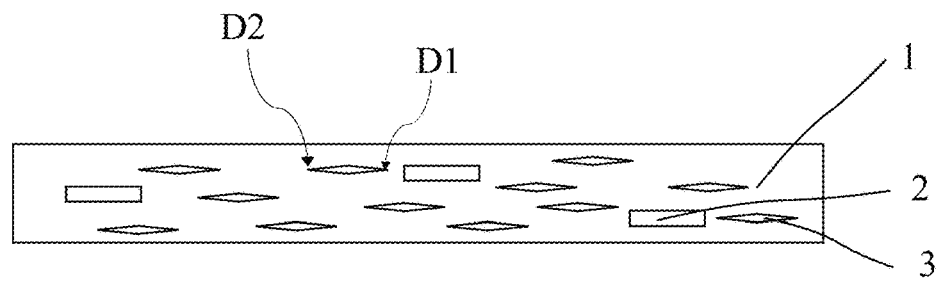
FIG. 5 is a schematic diagram of a light diffusion film in a second configuration according to embodiments of the present disclosure.
Figure 6:
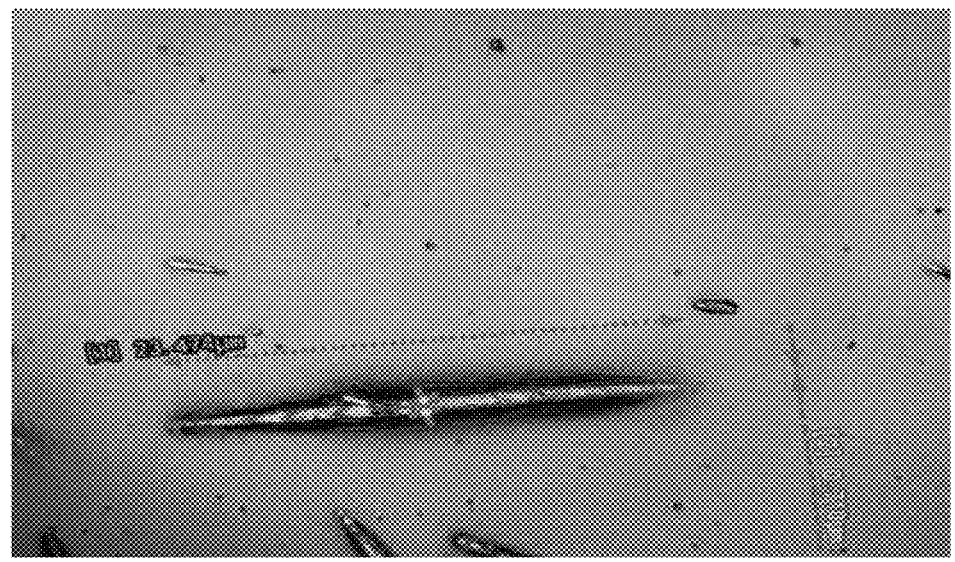
FIG. 6 is a characterization diagram of a second kind of second particles in a light diffusion film according to embodiments of the present disclosure.

Referring to FIGS. 5 and 6, an embodiment of the present disclosure provides a light diffusion film 10, which differs from the embodiment shown by FIG. 1 in that the diameter of the second end decreases progressively in a direction away from the first end. That is, each of the second particles 3 in this embodiment has a double cone shape.

It can be understood that the scattering effect of the second particles 3 having double cone shape is weaker than that of the first particles 2. The second particles 3 and the first particles 2 are mixed in the resin layer 1, so that the light diffusion film 10 has a scattering effect while the contrast of the display panel attached with the light diffusion film 10 is less affected, thus having better contrast.

Figure 7:
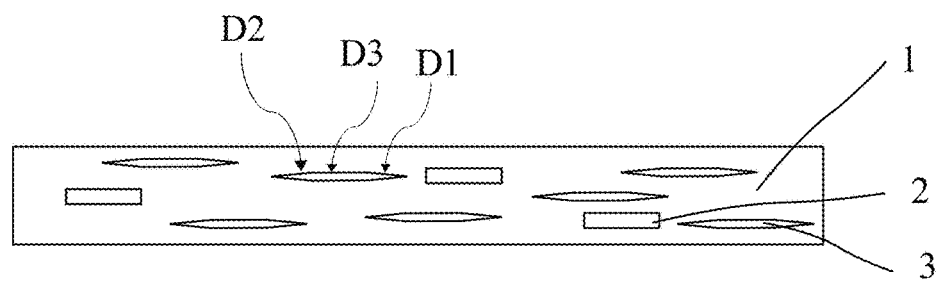
FIG. 7 is a schematic diagram of a light diffusion film in a third configuration according to embodiments of the present disclosure.
Figure 8:
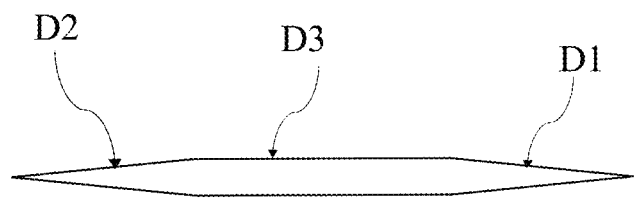
FIG. 8 is a schematic structural diagram of a third kind of second particles in a light diffusion film according to embodiments of the present disclosure.

Referring to FIGS. 7 and 8, an embodiment of the present disclosure provides a light diffusion film 10, which differs from the embodiments shown by FIG. 1 and FIG. 5 in that each of the second particles 3 further includes an intermediate portion D3, and the first end portion D1, the intermediate portion D3, and the second end portion D2 are sequentially connected. The diameter of the intermediate portion D3 remains unchanged in a longitudinal direction of the second particles 3. The diameter of the second end portion D2 decreases progressively in a direction away from the first end portion D1. That is, the second particles 3 in this embodiment include particles with a cylindrical shape in the middle and cone shapes at both ends.

It can be understood that the scattering effect of the second particles 3 with a columnar shape in the middle and cone shapes at both ends is weaker than that of the first particles 2. By mixing the second particles 3 and the first particles 2 in the resin layer 1, the light diffusion film 10 has a scattering effect while the contrast of the display panel attached with the light diffusion film 10 is less affected, thus having better contrast.

Figure 9:
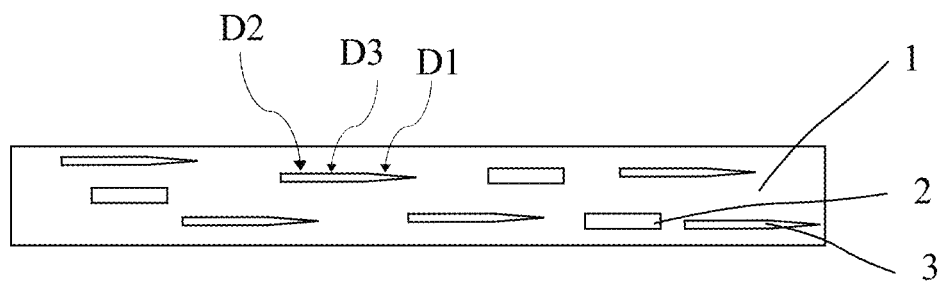
FIG. 9 is a schematic diagram of a light diffusion film in a fourth configuration according to embodiments of the present disclosure.
Figure 10:
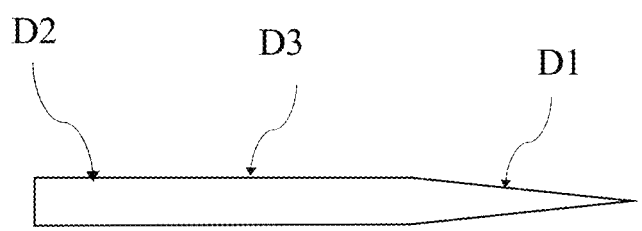
FIG. 10 is a schematic structural diagram of a fourth kind of second particles in a light diffusion film according to embodiments of the present disclosure.

Referring to FIGS. 9 and 10, another embodiment of the present disclosure provides a light diffusion film 10, which differs from the embodiment shown by FIG. 1 in that each of the second particles 3 further includes an intermediate portion D3, and the first end portion D1, the intermediate portion D3, and the second end portion D2 are sequentially connected. In the longitudinal direction of the second particles 3, the diameter of the intermediate portion D3 remains unchanged, and the diameter of the second end portion D2 also remains unchanged. That is, the second particles 3 in this embodiment include particles in which the first end portion D1 has a cone shape and the remaining portions are cylindrical.

It can be understood that the scattering effect of the second particles 3 in which the first end portion D1 has a cone shape and the remaining portions are cylindrical is weaker than that of the first particles 2. By mixing the second particles 3 and the first particles 2 in the resin layer 1, the light diffusion film 10 has a scattering effect while the contrast of the display panel attached with the light diffusion film 10 is less affected, thus having better contrast.

Figure 11:
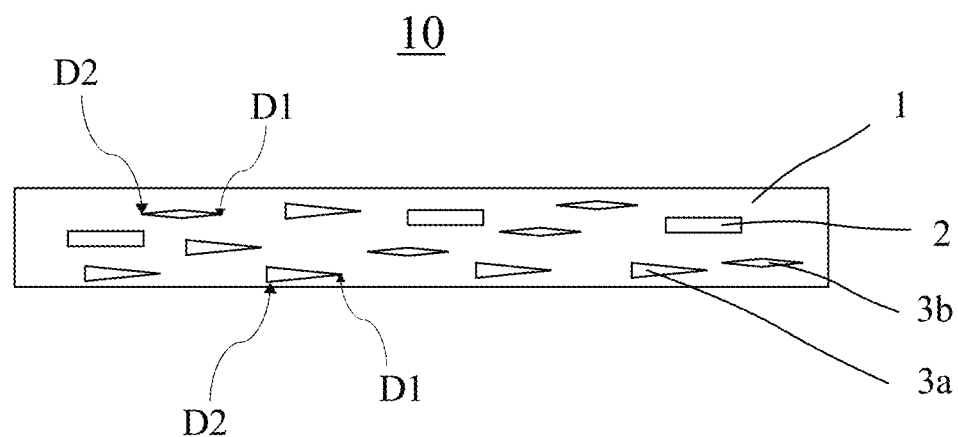
FIG. 11 is a schematic diagram of a light diffusion film in a fifth configuration according to embodiments of the present disclosure.
Figure 12:
FIG. 12 is a characterization diagram of first particles, first type of particles, and second type of particles in a light diffusion film according to embodiments of the present disclosure.

Referring to FIGS. 11 and 12, another embodiment of the present disclosure provides a light diffusion film 10, which differs from the embodiments shown by FIG. 1 and FIG. 5 in that the second particles 3 include a first type of particles 3a and a second type of particles 3b. Each of the first type of particles 3a includes a first end portion D1 and a second end portion D2 in a longitudinal direction thereof, and each of the second type of particles 3b includes a first end D1 and a second end D2 in a longitudinal direction thereof. The diameter of each of the first type of particles 3a decreases in the direction from the second end portion D2 of the first type of particles 3a to the first end portion D1 of the first type of particles 3a. The diameter of the first end portion D1 of the second type of particles 3b decreases progressively in a direction away from the second end portion D2 of the second type of particles 3b. The diameter of the second end portion D1 of the second type of particles 3b decreases progressively in a direction away from the first end portion D2 of the second type of particles 3b. That is, the second particles 3 in this embodiment include particles with long cone shapes and particles with double cone shapes.

It can be understood that the scattering effect of the second particles 3 including the first type of particles 3a with long cone shapes and the second type of particles 3b with double cone shapes is weaker than that of the first particles 2. By mixing the second particles 3 and the first particles 2 in the resin layer 1, the light diffusion film 10 has a scattering effect while the contrast of the display panel attached with the light diffusion film 10 is less affected, thus having better contrast.

It should be noted that the second particles 3 in each embodiment of the present disclosure can be arbitrarily combined. For example, the second particles 3 may include particles with long cone shapes and particles with double cone shapes. For another example, the second particle 3 may include particles with long cone shapes, particles with double cone shapes, and particles whose first end portion D1 is a cone and the remaining portions are cylindrical. The second particles 3 may also be a combination of particles with double cone shapes, and particles whose first end portion D1 is a cone and the remaining portions are cylindrical. Alternatively, the second particles 3 may be a combination of particles with long cone shapes, both the first end portion D1 and the second end portion D2 have a cone shape, In this embodiment, a ratio of a mass of all the first particles 2, a mass of all the first type of particles 3a and a mass of all the second type of particles 3b is (1 to 10):(40 to 70):(20 to 60). Specifically, the ratio of the mass of all the first particles 2, the mass of all the first type of particles 3a, and the mass of all second type of particles 3b may be 1:40:59, 2:42:56, 3:45:52, 4:48:48, 5:70:25, 5:69:26, 6:68:26, 7:55:38, 8:55:37, or 9:52:39.

It can be understood that when the mass ratio of the first particles 2, the first type of particles 3a, and the second type of particles 3b is within this range, the chromaticity viewing angle and the contrast can be larger when the light diffusion film 10 is attached onto the display panel.

Furthermore, the ratio of the mass of all the first particles 2, the mass of all the first type of particles 3a, and the mass of all the second type of particles 3b can be (50~55):(1 to 5):(45~50), so that the display panel attached with the light diffusion film 10 has a chromaticity viewing angle of equal to or greater than 160 degrees, and the contrast is equal to or greater than 2800. Specifically, the ratio of the mass of all the first particles 2, the mass of all the first type of particles 3a, and the mass of all the second type of particles 3b is 50:5:45, 51:4:45, 52:3:45, 53:2:45, or 54:1:45.

Optionally, a sum of the masses of the first particles 2, the first type of particles 3a, and the second type of particles 3b account for 1% to 30% of the mass of the light diffusion film 10. Specifically, the sum of the masses of the first particles 2, the first type of particles 3a, and the second type of particles 3b account for 1%, 2%, 5%, 7%, 8%, 10%, 15%, 20%, or 30% of the mass of the light diffusion film 10. When the sum of the masses of the first particles 2, the first type of particles 3a, and the second type of particles 3b is within this range, the light diffusion film 10 has strong scattering effect and high light transmittance.

In this embodiment, the sum of the masses of the first particles 2, the first type of particles 3a, and the second type of particles 3b account for 10% of the mass of the light diffusion film 10, so that the display panel attached with the light diffusion film 10 has a chromaticity angle of equal to or greater than 160 degrees, and the transmittance is equal to or greater than 4.65%.

The light diffusion film 10 in the present disclosure may be attached onto a light-emitting side of a backlight module to improve light diffusion of the backlight module. It can also be attached onto the light-emitting side of a lamp to improve light diffusion of the LED lamp. It can also be attached onto the light-emitting surface of an in-vehicle display panel to improve the viewing angle of the in-vehicle display panel.

The present disclosure further provides a polarizer 100 including any of the light diffusion films 10 as described above. The material of the resin layer 1 of the light diffusion film 10 may be selected from a polyurethane resin, an acrylate resin, an epoxy resin, a vinyl resin, a silicone resin, polyvinyl alcohol, and the like. It can be understood that the material and properties of the resin layer 1 may vary depending on its specific location in the polarizer 100. Different embodiments of the polarizer 100 of the present disclosure will be described below.

According to some embodiments of the present disclosure, the polarizer 100 includes any of the light diffusion films 10 as described above. The polarizer 100 further includes a first substrate 15, a second substrate 17, and a polarizing functional layer 14. The first substrate 15 and the second substrate 17 are disposed on opposite sides of the light diffusion film 10, respectively, and the polarizing functional layer 14 is disposed on one side of the first substrate 15 away from the light diffusion film 10. Optionally, the resin layer 1 of the light diffusion film 10 is used as an adhesive layer to bond the first substrate 15 and the second substrate 17. Optionally, the polarizer 100 further includes an adhesive layer, which is disposed between the first substrate 15 and the light diffusion film 10 and bonds the first substrate 15 and the light diffusion film 10.

Figure 13:
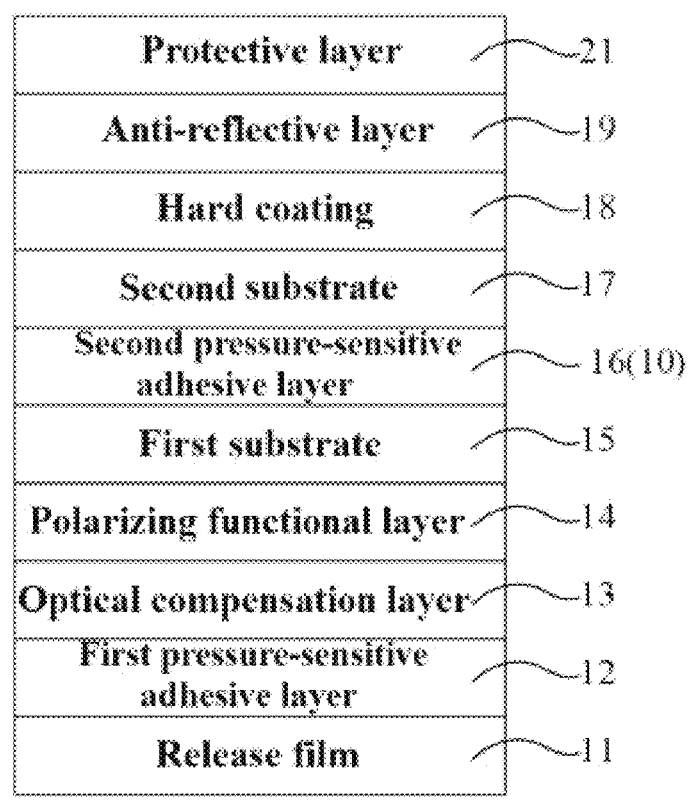
FIG. 13 is a schematic diagram of a polarizer in a first configuration according to embodiments of the present disclosure.

Referring to FIG. 13, an embodiment of the resin layer 1 of the light diffusion film 10 as an adhesive layer is shown in FIG. 13. The polarizer 100 includes a release film 11, a first pressure-sensitive adhesive layer 12, an optical compensation layer 13, a polarizing functional layer 14, a first substrate 15, a second pressure-sensitive adhesive layer 16, a second substrate 17, a hard coating 18, an anti-reflective layer 19, and a protective layer 21 that are sequentially stacked. In the use state of the polarizer 100, the direction from the release film 11 to the protective layer 21 is the stacking direction of the film layers in the polarizer 100 and the incident direction of light. In this embodiment, the first particles 2 and the second particles 3 are disposed in the second pressure-sensitive adhesive layer 16. That is, the resin layer 1 of the light diffusion film 10 is the second pressure-sensitive adhesive layer 16.

The release film 11 is configured to protect the pressure-sensitive adhesive layer from being damaged before the polarizer 100 is attached onto the liquid crystal display panel 200, and to avoid the generation of bonding bubbles. The release film 11 may be a polyester film such as a polyethylene terephthalate film, a polyolefin film such as a polyethylene film and a polypropylene film, or a polytetrafluoroethylene film, or a film subjected to peeling treatment by using a silicone resin, a melamine resin or a urea resin, so that the release film 11 can be easily peeled off.

A first pressure-sensitive adhesive (PSA) layer 12 is disposed on one side of the release film 11. The first pressure-sensitive adhesive layer 12 is an adhesive layer for bonding the release film 11 and other film layers such as a polarizing functional layer 14 disposed on the release film 11. The material of the first pressure-sensitive adhesive layer 12 may be, for example, an acrylate resin.

The optical compensation layer 13 is disposed on one side of the first pressure-sensitive adhesive layer 12 away from the release film 11. The optical compensation layer 13 may be a compensation layer in which a liquid crystal compound is coated on the surface of the substrate 15 and is oriented and fixed or a phase difference film or the like.

The polarizing functional layer 14 is disposed on one side of the optical compensation layer 13 away from the first pressure-sensitive adhesive layer 12. The polarizing functional layer 14 may include polyvinyl alcohol. Specifically, the polarizing functional layer 14 may include a polyvinyl alcohol film dyed with iodine or a polyene compound obtained by dewatering the polyvinyl alcohol film.

The first substrate 15 is disposed on one side of the polarizing functional layer 14 away from the optical compensation layer 13. The first substrate 15 is used to protect the polarizing functional layer 14 and support the film layers located above the first substrate 15. The first substrate 15 may include, but is not limited to, at least one material selected from a cellulose ester resin including triacetyl cellulose (TAC) or the like, a cyclic polyolefin resin including amorphous cyclic polyolefin (COP) or the like, a polycarbonate resin, a polyester resin including polyethylene terephthalate (PET) or the like, a polyethersulfone resin, a polysulfone resin, a polyamide resin, a polyimide resin, a non-cyclic polyolefin resin, a polyacrylate resin including polymethyl methacrylate resin or the like, a polyvinyl alcohol resin, a polyvinyl chloride resin, and a polyvinylidene chloride resin. Specifically, the material of the first substrate 15 is polyethylene terephthalate (PET).

The second pressure-sensitive adhesive layer 16 is disposed on one side of the first substrate 15 away from the polarizing functional layer 14. The second pressure-sensitive adhesive layer 16 is the same as the first pressure-sensitive adhesive layer 12, and is an adhesive layer for bonding the first substrate 15 and the second substrate 17. An optional material of the second pressure-sensitive adhesive layer 16 is the same as that of the first pressure-sensitive adhesive layer 12, and the description thereof is omitted here.

The second substrate 17 is disposed on one side of the second pressure-sensitive adhesive layer 16 away from the first substrate 15. The second substrate 17 is used to support the film layers above the second substrate 17. An optional material of the second substrate 17 is the same as that of the first substrate 15, and the description thereof is omitted here. Specifically, the material of the second substrate 17 is polyethylene terephthalate (PET).

The hard coating 18 is disposed on one side of the second substrate 17 away from the second pressure-sensitive adhesive layer 16. The hard coating 18 has characteristics of high hardness, water resistance and oil resistance, which can well prevent surfaces of the underlying film layer from being scratched and is easier to clean. Optionally, the hard coating 18 has a high glass transition temperature, for example ranging from 70 degrees Celsius to 120 degrees Celsius. The material of the hard coating 18 may be selected from polyurethane resins, acrylate resins, epoxy resins, vinyl resins, or silicone resins.

The anti-reflective (AR) layer 19 is disposed on one side of the hard coating 18 away from the second substrate 17. The anti-reflection layer 19 is used to prevent reflections and scratches. The anti-reflection layer 19 is, for example, a dielectric thin film formed on the surface of the hard coating 18.

The surface protective layer 21 is used to protect the underlying film layers. The surface protective layer 21 may be a transparent resin film formed by the following materials: thermoplastic resin such as linear polyolefin resins (polypropylene-based resin or the like), cyclic polyolefin resins (norbornene resins or the like), or the like; cellulose ester resins such as cellulose triacetate and cellulose diacetate; polyester resins such as polyethylene terephthalate, polyethylene naphthalate, and polybutylene terephthalate; polycarbonate resins; and (methyl) acrylic resins; or a mixture thereof, or a copolymer thereof, or the like.

Besides the above-mentioned film layers, the polarizer 100 may include another film layer such as an antistatic layer, which will not be described herein.

Figure 14:
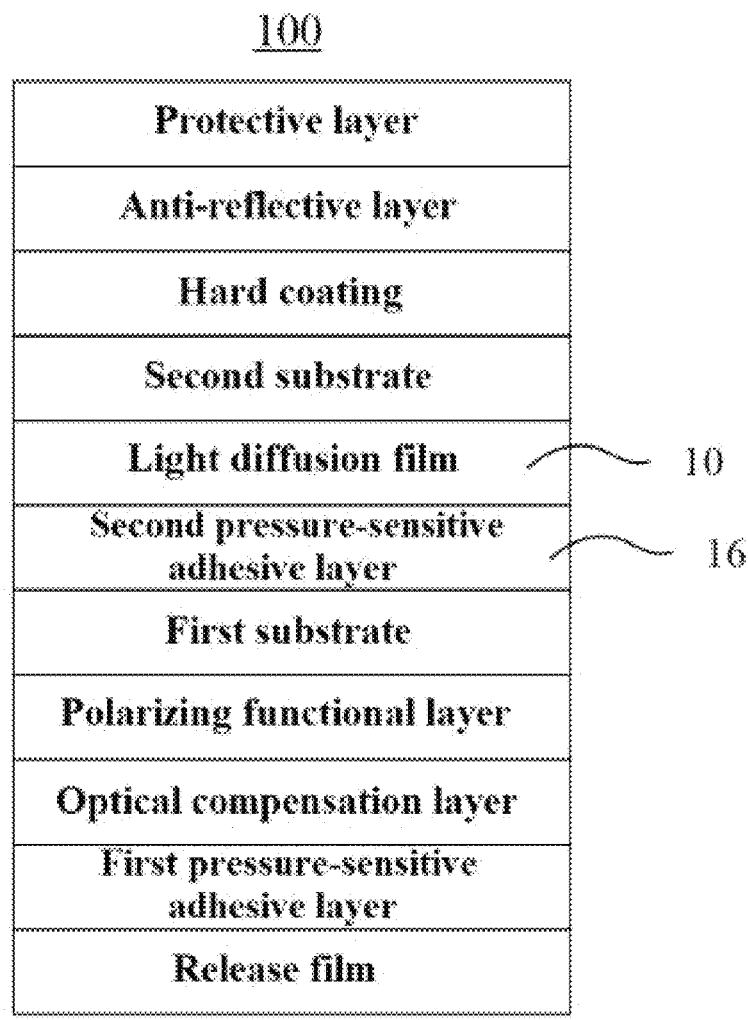
FIG. 14 is a schematic diagram of a polarizer in a second configuration according to embodiments of the present disclosure.

Referring to FIG. 14, a polarizer 100 in which an adhesive layer is bonded between a first substrate 15 and a light diffusion film 10 is shown in FIG. 14. The embodiment shown by FIG. 14 differs from the embodiment shown by FIG. 13 in that the first particles 2 and the second particles 3 are not dispersed in a second pressure-sensitive adhesive layer 16, but a light diffusion film 10 is disposed on the second pressure-sensitive adhesive layer 16, Further, the light diffusion film 10 includes a resin layer 1 in which the first particles 2 and the second particles 3 are dispersed.

The material of the resin layer 1 may be selected from a polyurethane resin, an acrylate resin, an epoxy resin, a vinyl resin, and a silicone resin.

According to some embodiments of the present disclosure, the polarizer 100 includes of a light diffusion film 10 as described above, and further includes a substrate 15, a polarizing functional layer 14, and a hard coating 18. The substrate 15 is disposed between the polarizing functional layer 14 and the hard coating 18. The resin layer 1 is any one of the substrate 15, the polarizing functional layer 14, and the hard coating 18.

Figure 15:
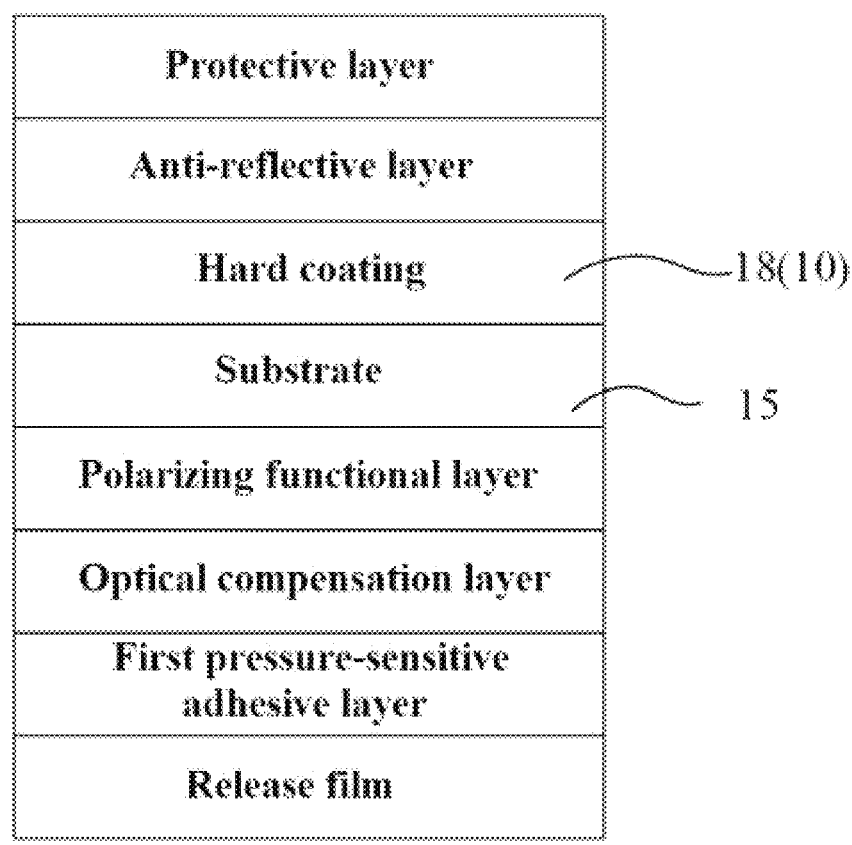
FIG. 15 is a schematic diagram of a polarizer in a third configuration according to embodiments of the present disclosure.

Referring to FIG. 15, a polarizer 100 in which the resin layer 1 of the light diffusion film 10 is the hard coating 18 is shown in FIG. 15. The embodiment shown by FIG. 15 differs from the embodiment shown by FIG. 13 in that the first particles 2 and the second particles 3 are not dispersed in the second pressure-sensitive adhesive layer 16, but are dispersed in the hard coating 18. In this embodiment, the second substrate 17 and the second pressure-sensitive adhesive layer 16 may be omitted, and only one substrate 15 may be disposed. By omitting the second substrate 17, the structure of the polarizer 100 can be simplified, and the brightness and the contrast thereof can be improved.

Figure 16:
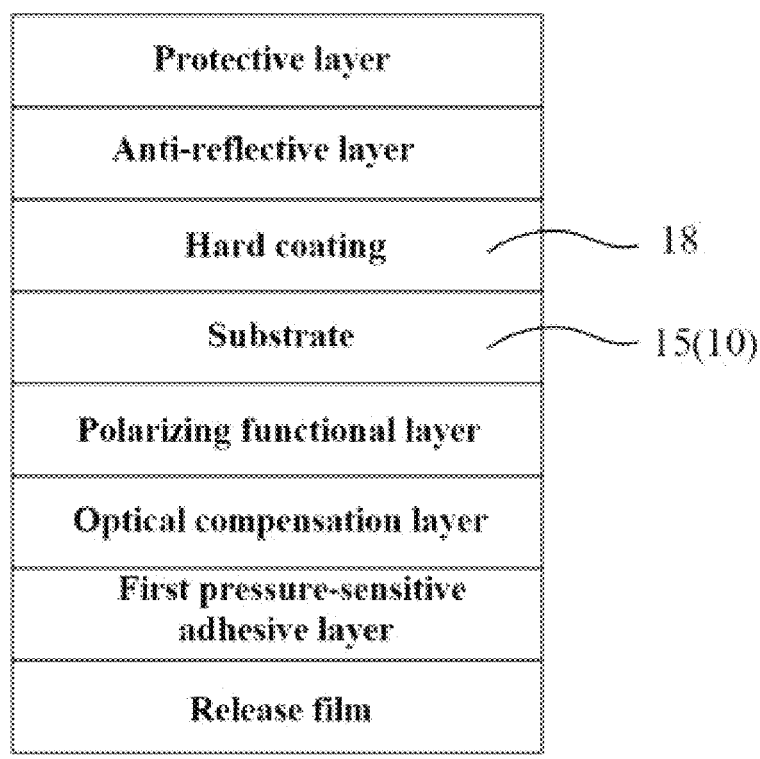
FIG. 16 is a schematic diagram of a polarizer in a fourth configuration according to embodiments of the present disclosure.

Referring to FIG. 16, an embodiment in which the resin layer 1 of the light diffusion film 10 is a substrate 15 is shown in FIG. 16. The embodiment shown by FIG. 16 differs from the embodiment shown by FIG. 15 in that the first particles 2 and the second particles 3 are not dispersed in the hard coating 18, but are dispersed in the substrate 15. In this embodiment, only one substrate 15 may be disposed. In this structure, the substrate 15 and the polarizing functional layer 14 may be prepared together by a stretching process.

Figure 17:
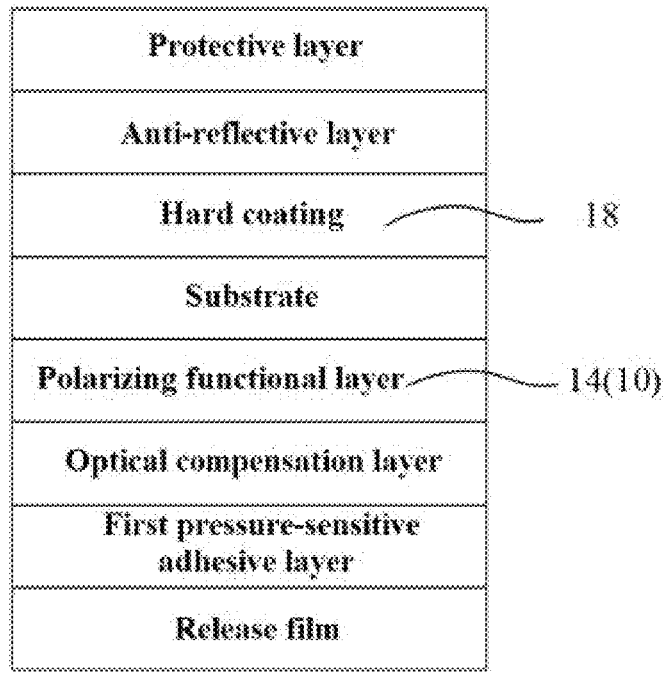
FIG. 17 is a schematic diagram of a polarizer in a fifth configuration according to embodiments of the present disclosure.

Referring to FIG. 17, an embodiment in which the resin layer 1 of the light diffusion film 10 is a polarizing functional layer 14 is shown in FIG. 17. The embodiment shown by FIG. 17 differs from the embodiment shown by FIG. 15 in that the first particles 2 and the second particles 3 are not dispersed in the hard coating 18, but are dispersed in the polarizing functional layer 14. In this embodiment, only one substrate 15 may be disposed. In this structure, the polarizing functional layer 14 may be prepared by a stretching process.

In this embodiment, the first particles 2 and the second particles 3 are directionally arranged in the resin layer 1. An included angle between a longitudinal direction of the first particles 2 and an absorption axis of the polarizing functional layer 14 ranges from −10 degrees to 10 degrees. It can be understood that when the polarizer 100 is attached onto the display film layers, the directional arrangement of the first particles 2 and the second particles 3 in the resin layer 1 causes the viewing angle of the display panel to expand in a direction perpendicular to the absorption axis.

Specifically, the process for carry out directional arrangement of the first particles 2 and the second particles 3 in the resin layer 1 may be coating, casting, or stretching. For example, in the embodiment of FIG. 15, the first particles 2 and the second particles 3 are dispersed in the hard coating 18. The hard coating 18 is achieved by coating, and the first particles 2 and the second particles 3 are directionally arranged in the hard coating 18 after coating. For example, in the embodiment of FIG. 16, the first particles 2 and the second particles 3 are dispersed in the substrate 15, and the substrate 15 is attached to the polarizing functional layer 14. The substrate 15 and the polarizing functional layer 14 are formed together by a stretching process, and the first particles 2 and the second particles 3 are directionally arranged in the substrate 15 after stretching. As another example, in the embodiment of FIG. 17, the first particles 2 and the second particles 3 are dispersed in the polarizing functional layer 14. The polarizing functional layer 14 is prepared by a stretching process, and the first particles 2 and the second particles 3 are directionally arranged in the polarizing functional layer 14 after stretching.

Figure 18:
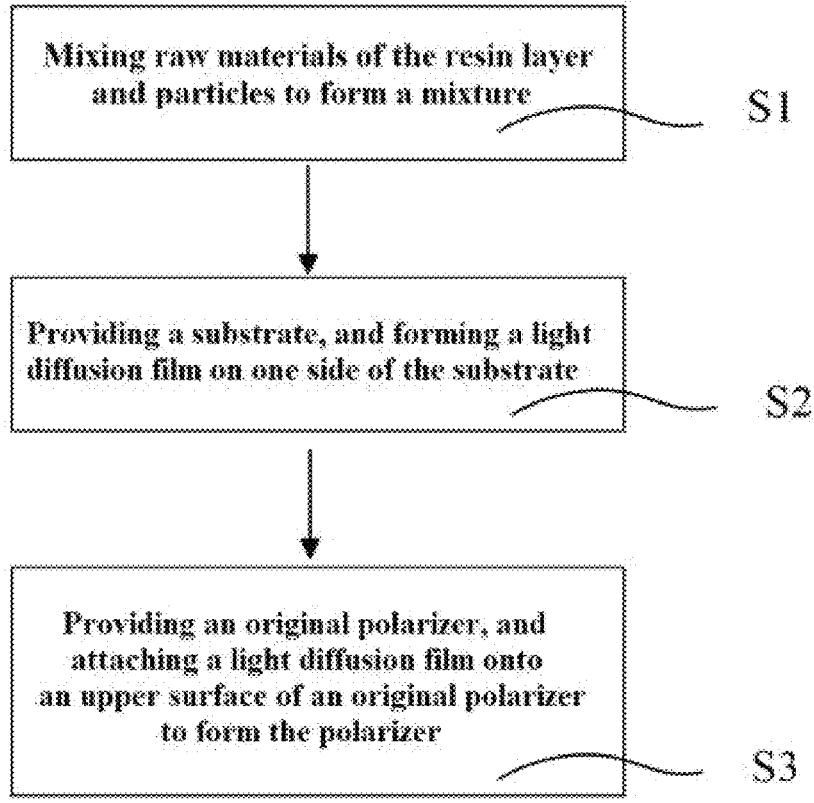
FIG. 18 is a schematic flow diagram of a method for preparing a polarizer according to embodiments of the present disclosure.
Figure 19:
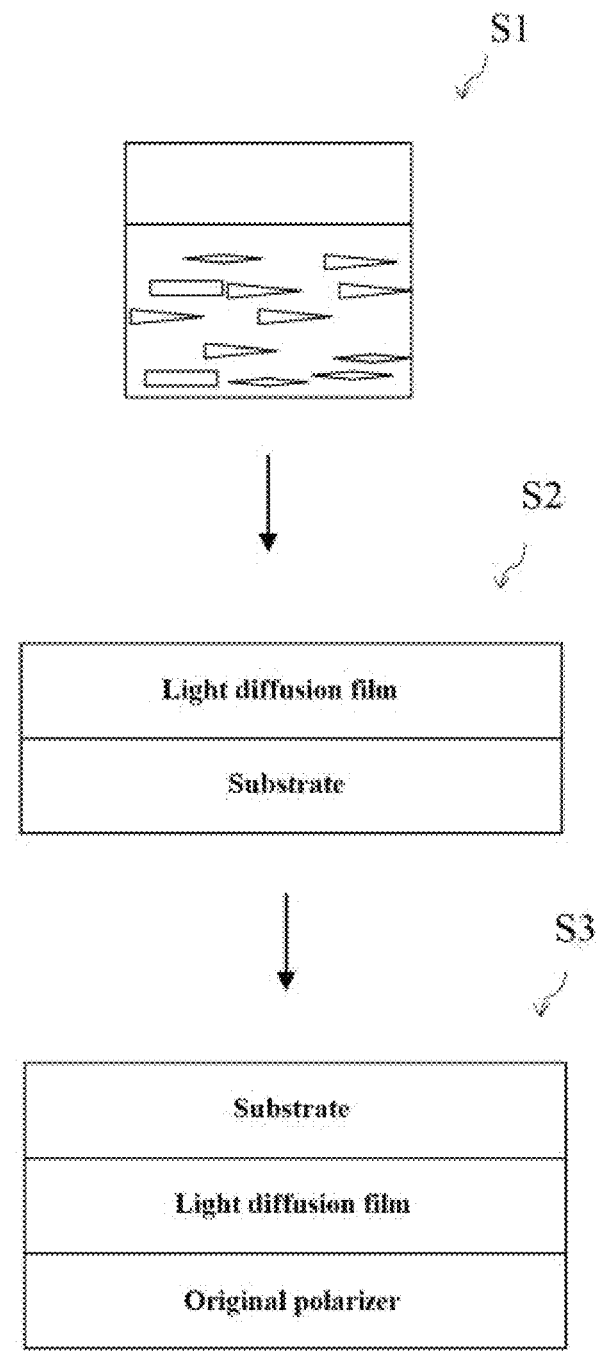
FIG. 19 is a schematic structural diagram of steps S1 to S3 in FIG. 14.

The present disclosure further provides a method for preparing a polarizer 100. Referring to FIGS. 18 and 19, a method for preparing a polarizer 100 in which first particles 2 and second particles 3 are disposed in a pressure-sensitive adhesive layer includes steps as follows:

Step S1, mixing raw materials of the resin layer 1 and particles to form a mixture. The particles include first particles 2 and second particles 3, and each of the first particles 2 has a diameter remaining unchanged in a longitudinal direction of the first particles 2. Each of the second particles 3 includes a first end portion D1 and a second end portion D2 in a longitudinal direction thereof, and a diameter of the first end portion D1 decreases progressively in a direction away from the second end portion D2.

Step S2, providing a substrate 15, and forming a light diffusion film 10 on one side of the substrate 15.

Step S3, providing an original polarizer, and attaching a light diffusion film 10 onto an upper surface of an original polarizer to form the polarizer 100.

The steps of the preparation method are described in detail below.

Step S1, mixing raw materials of the resin layer 1 and particles to form a mixture. The particles include first particles 2 and second particles 3, and each of the first particles 2 has a diameter remaining unchanged in a longitudinal direction of the first particles 2. Each of the second particles 3 includes a first end portion D1 and a second end portion D2 in a longitudinal direction thereof, and a diameter of the first end portion D1 decreases progressively in a direction away from the second end portion D2.

Specifically, the raw materials of the resin layer 1 are pressure-sensitive adhesive raw materials. The pressure-sensitive adhesive raw materials are added in an amount of 200 kg, of which the content of pressure-sensitive adhesives is 15.78%.

Specifically, the particles are calcium carbonate particles, and the total mass of the particles is 3.156 kg. The particles include the first particles 2 and the second particles 3. Each of the first particles 2 is a cylindrical particle. The second particles 3 include a first type of particles 3a and a second type of particles 3b. Each of the first type of particles 3a includes a first end portion D1 and a second end portion D2 in the longitudinal direction thereof. Each of the second type of particles 3b includes a first end D1 and a second end D2 in the longitudinal direction thereof. The diameter of the first type of particles 3a decreases progressively in a direction from the second end portion D2 of the first type of particles 3a to the first end portion D1 of the first type of particles 3a. The diameter of the second end portion D2 of the second type of particles 3b decreases progressively in a direction away from the first end portion D1 of the second type of particles 3b. That is, the first type of particles 3a are particles having long cone shape, and the second type of particles 3b are particles having double cone shape.

A mass of the first particles 2 is 0.063 kg, a mass of the first type of particles 3a is 1.67 kg, and a mass of the second type of particles 3b is 1.42 kg. That is, the ratio of the mass of all the first particles 2, the mass of all the first type of particles 3a, and the mass of all the second type of particles 3b is 53:2:45.

Optionally, the viscosity of the mixture is kept in a range from 1000 centipoise to 2000 centipoise, which is converted into a range from 1 Pascal to 2 Pascal in international units. It can be understood that the mixture is easy to flow in this viscosity range, which is convenient for coating.

Optionally, a silane coupling agent, a curing agent, and ethyl acetate may also be mixed with the raw materials of the resin layer 1 to form a mixture, which is beneficial to cross-linking and curing of the mixture. The mass of the silane coupling agent is 0.09 kg and the mass of the curing agent is 0.14 kg.

Optionally, the mixture is stirred at room temperature of 25 degrees Celsius for 1 hour, then it is left to stand for 2 hours. It can be understood that stirring may make the particles mix more evenly in the pressure-sensitive adhesive raw materials, and standing can make the mixture defoam, that is, the bubbles in the mixture overflow.

Step S2, providing a substrate 15, and forming a light diffusion film 10 on one side of the substrate 15.

Specifically, providing a substrate 15 is provided, and coating a mixture on one side of the substrate 15, so that a light diffusion film 10 can be formed after curing of the mixture. The light diffusion film 10 is attached onto one side of the substrate 15.

Optionally, the substrate 15 coated with the mixture is subjected to baking, which is beneficial to the formation of the light diffusion film 10.

Optionally, both the substrate 15 and the light diffusion film 10 have a thickness of 25 microns.

Step S3, providing an original polarizer, and attaching a light diffusion film 10 onto an upper surface of an original polarizer to form the polarizer 100.

Specifically, the light diffusion film 10 is used as an adhesive layer and attached onto the upper surface of the polarizer to form a composite original polarizer. The composite original polarizer is cut to form a polarizer 100 with a length of 1438 mm and a width of 812 mm.

Optionally, the above substrate 15 may also be the second substrate 17. The original polarizer includes a release film 11, a first pressure-sensitive adhesive layer 12, an optical compensation layer 13, a polarizing functional layer 14, and a first substrate 15 that are sequentially stacked. The light diffusion film 10 is used as a second pressure-sensitive adhesive layer 16, and is attached onto one side of the first substrate 15 away from the polarizing functional layer 14. The second substrate 17 is attached onto one side of the first substrate 15 away from the polarizing functional layer 14 with the light diffusion film 10 as an adhesive layer.

At this point, the preparation of the polarizer 100 is completed.

Figure 20:
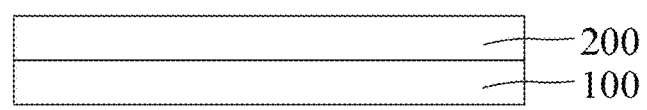
FIG. 20 is a schematic structural diagram of a liquid crystal display device according to embodiments of the present disclosure.

Referring to FIG. 20, the present disclosure further provides a liquid crystal display device 1000 including a polarizer 100 as described above and a liquid crystal display panel 200, wherein the polarizer 100 is disposed on the light-emitting side of the liquid crystal display panel 200. That is, the polarizer 100 of the present disclosure is used as an upper polarizer 100 of the liquid crystal display device 1000. The liquid crystal display device 1000 further includes structures such as a backlight module and a lower polarizer disposed on the light-incident side of the liquid crystal display panel 200, and the description thereof are omitted herein.

Contrast (CR) refers to the ratio of the brightness of a display panel in a white state to the brightness of a display panel in a dark state. In this experiment, the central brightness of the display panel in white state and the central brightness of the display panel in dark state are measured.

The chromaticity viewing angle measurement is a viewing angle measurement performed by CESI standard (CESI0.03).

Some test results are given as reference to further describe the present disclosure in detail. Details of the test are shown in Table 1.

TABLE 1

| Items | Mass ratio of L1, L2 and L3 | Total contents of particles (wt %) | Contrast, CR | Transmittance, Tr (%) | Chromaticity viewing angle (°) |
|---|---|---|---|---|---|
| Example 1 | 5:50:45 | 10 | 2801 | 4.65 | 173 |
| Example 2 | 4:51:45 | 10 | 2860 | 4.71 | 169 |
| Example 3 | 3:52:45 | 10 | 2904 | 4.76 | 166 |
| Example 4 | 2:53:45 | 10 | 2925 | 4.80 | 164 |
| Example 5 | 1:54:45 | 10 | 2930 | 4.82 | 163 |
| Comparative Example 1 | 0:100:0 | 10 | 3517 | 4.93 | 159 |
| Comparative Example 2 | 100:0:0 | 10 | 2762 | 4.63 | 173 |
| Comparative Example 3 | 0:100:0 | 7 | 3607 | 4.94 | 151 |
| Comparative Example 4 | 100:0:0 | 7 | 2989 | 4.71 | 169 |
| Comparative Example 5 | 0:0:100 | 7 | 3674 | 4.95 | 146 |

The optical effect of the light-diffusing film 10 in the specific embodiments of the present disclosure has been tested by several tests.

In this experiment, the resin layer 1 in the light diffusion film 10 is the second pressure-sensitive adhesive layer 16, and the thickness of the second pressure-sensitive adhesive layer 16 is 20 microns. Both the first particles 2 and the second particles 3 in the resin layer 1 have a length within a range from 10 microns to 30 microns and a diameter within a range from 1 micron to 3 microns. In this experiment, the light diffusion film 10 is disposed in the polarizer 100 as the second pressure-sensitive adhesive layer 16, then the polarizer 100 is attached onto the surface of a 75-inch liquid crystal display panel 200 to test the optical effects. The tested polarizer 100 includes a release film 11, a first pressure-sensitive adhesive layer 12, an optical compensation layer 13, a polarizing functional layer 14, a first substrate 15, a second pressure-sensitive adhesive layer 16 (light diffusion film 10), a second substrate 17, a hard coating 18, an anti-reflective layer 19, and a protective layer 21 that are sequentially stacked.

It should be noted that L1 refers to the first particles 2, and each of the first particles 2 has a diameter remaining unchanged in a longitudinal direction of the first particles 2, that is, the first particles 2 are cylindrical. L2 refers to particles in the second particles 3 whose diameters decrease progressively in the direction of the second end portion D2 to the first end portion D1, that is, particles having long cone shapes. L3 refers to particles in the second particles 3 whose diameters of the second end portion D2 decreases progressively in the direction away from the first end portion D1 of the particles; and diameters of the first end portion D1 decreases progressively in the direction away from the second end portion D2 of the particles, i.e., particles having double cone shapes.

According to Table 1, it can be seen from the comparison of comparative example 3, comparative example 4, and comparative example 5 that the light diffusion film according to Table 1, it can be seen from the comparison of comparative example 3, comparative example 4, and comparative example 5, that when only the first particles 2 having the same diameter everywhere, i.e., only the cylindrical particles are disposed in the light diffusion film 10, the contrast of the display panel is obviously lower than that of the display panel with only particles having double cone shapes disposing in the light diffusion film 10 and the display panel with only particles having long cone shapes disposing in the light diffusion film 10. The light transmittance of the display panel with only the cylindrical particles disposed in the light diffusion film 10 is also slightly lower than that of the display panel with only particles having double cone shapes disposing in the light diffusion film 10 and the display panel with only particles having long cone shapes disposing in the light diffusion film 10.

According to Table 1, it can be seen from the comparison between examples 1 to 5 and comparative example 1 that the chromaticity viewing angle of the display panel attached with the light diffusion film 10 in which the first particles 2 and the second particles 3 are mixed in the adhesive resin layer 1 is higher than the chromaticity viewing angle of the display panel attached with the light diffusion film 10 in which only the second particles 3 are disposed in the adhesive resin layer 1. The chromaticity viewing angle of the display panel attached with the light diffusion film 10 in which the first particles 2 and the second particles 3 are mixed in the adhesive resin layer 1 can reach 160 degrees or greater than 160 degrees. As can be seen from the comparison between examples 1 to 5 and comparative example 2, both the contrast and transmittance of the display panel attached with the light diffusion film 10 in which the first particles 2 and the second particles 3 are mixed in the adhesive resin layer 1 are higher than the contrast and transmittance of the display panel attached with the light diffusion film 10 in which only the first particles 2 are disposed in the adhesive resin layer 1. The display panel of the light diffusion film 10 in which the first particles 2 and the second particles 3 are mixed in the adhesive resin layer 1 may have a contrast of equal to 2800 or greater than 2800 and a transmittance of equal to 4.65% or greater than 4.65%. It can be seen from above that the light diffusion film 10 in the present disclosure has excellent performance and has good application prospect.

The light diffusion film 10, the polarizer 100 and the liquid crystal display device 1000 provided in the embodiments of the present disclosure are described in detail above.

In the present disclosure, the first particles and the second particles are disposed in the resin layer of the light diffusion film, so that the light diffusion film has a scattering effect, and the display panel attached with the light diffusion film has better contrast. Each of the plurality of first particles has a diameter remaining unchanged in a longitudinal direction of the plurality of first particles. Each of the plurality of second particles includes a first end portion and a second end portion in a longitudinal direction thereof, and a diameter of the first end portion decreases progressively in a direction away from the second end portion. Both the first particles and the second particles enable the light diffusion film to have a scattering effect, and can improve the chromaticity viewing angles of a polarizer attached with the light diffusion film. Moreover, mixing of the second particles with the first particles can reduce effects on the contrast of the display panel attached with the light diffusion film, so that the display panel with the light diffusion film has better contrast.

The principles and embodiments of the present disclosure have been illustrated with reference to specific examples, and the descriptions of the above examples are only used to help understand the method and core idea of the present disclosure. It should be noted that those skilled in the art can make some improvements and modifications to the present disclosure without departing from the principles of the present disclosure, and these improvements and modifications also fall within the protection scope of the claims attached to the present disclosure.

What is claimed is:

1. A light diffusion film comprising a resin layer and a plurality of first particles and a plurality of second particles disposed in the resin layer; wherein
   each of the plurality of first particles has a diameter remaining unchanged in a longitudinal direction of the plurality of first particles;
   each of the plurality of second particles comprises a first end portion and a second end portion in a longitudinal direction thereof, and a diameter of each of the plurality of second particles decreases progressively in a direction from the second end portion to the first end portion;
   a ratio of a mass of all the plurality of first particles to a mass of all the plurality of second particles is (1 to 10):(90 to 99);
   each of the plurality of second particles further comprises a first body portion, a second body portion and an intermediate portion, and the second body portion, the intermediate portion, and the first body portion are sequentially connected; and
   in a direction from the second end portion to the first end portion, a diameter of the second body portion remains unchanged, a diameter of the intermediate portion remains unchanged, and a diameter of the first body portion decreases progressively.

2. The light diffusion film according to claim 1, wherein each of the plurality of first particles has a diameter ranging from 0.008 microns to 12.4 microns, each of the plurality of second particles has a maximum diameter of 12.4 microns, and each of the plurality of second particles has a minimum diameter of 0.008 microns.

3. The light diffusion film according to claim 1, wherein each of the plurality of first particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of first particles is one or more organic particles selected from polymethylmethacrylate particles, polystyrene particles, polycarbonate particles, silicone elastomer particles, butyl acrylate-styrene particles, and poly (methyl 4-hydroxybenzoate) particles;
   each of the plurality of second particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of second particles is one or more organic particles selected from polymethylmethacrylate particles, polystyrene particles, polycarbonate particles, silicone elastomer particles, butyl acrylate-styrene particles, and poly (methyl 4-hydroxybenzoate) particles.

4. A polarizer comprising the light diffusion film according to claim 1, wherein the polarizer further comprises a substrate, a polarizing functional layer, and a hard coating, the substrate is disposed between the polarizing functional layer and the hard coating, and the resin layer is any one of the substrate, the polarizing functional layer and the hard coating.

5. The polarizer according to claim 4, wherein the plurality of first particles and the plurality of second particles are directionally disposed in the resin layer, an included angle between a longitudinal direction of the plurality of first particles and an absorption axis of the polarizing functional layer ranges from −10 degrees to 10 degrees, and an included angle between a longitudinal direction of the plurality of second particles and absorption axis of the polarizing functional layer ranges from −10 degrees to 10 degrees.

6. A liquid crystal display device comprising the polarizer according to claim 4 and a liquid crystal display panel, the polarizer being disposed at a light-emitting side of the liquid crystal display panel.

7. The light diffusion film according to claim 1, wherein each of the plurality of first particles has a diameter ranging from 0.008 microns to 12.4 microns, each of the plurality of second particles has a maximum diameter of 12.4 microns, and each of the plurality of second particles has a minimum diameter of 0.008 microns.

8. The light diffusion film according to claim 1, wherein each of the plurality of first particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of first particles is one or more organic particles selected from polymethylmethacrylate particles, polystyrene particles, polycarbonate particles, silicone elastomer particles, butyl acrylate-styrene particles, and poly (methyl 4-hydroxybenzoate) particles; and each of the plurality of second particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of second particles is one or more organic particles selected from polymethylmethacrylate particles, polystyrene particles, polycarbonate particles, silicone elastomer particles, butyl acrylate-styrene particles, and poly (methyl 4-hydroxybenzoate) particles.

9. A light diffusion film comprising a resin layer, and a plurality of first particles and a plurality of second particles disposed in the resin layer; wherein each of the plurality of first particles has a diameter remaining unchanged in a longitudinal direction of the plurality of first particles;

each of the plurality of second particles comprises a first end portion and a second end portion in a longitudinal direction thereof, and a diameter of each of the plurality of second particles increases firstly and then decreases in a direction from the second end portion to the first end portion; and a ratio of a mass of all the plurality of first particles to a mass of all the plurality of second particles is (1 to 10):(90 to 99);

each of the plurality of second particles further comprises a first body portion, a second body portion and an intermediate portion, and the second body portion, the intermediate portion, and the first body portion are sequentially connected; and in a direction from the second end portion to the first end portion, a diameter of the second body portion increases progressively, a diameter of the intermediate portion remains unchanged, and a diameter of the first body portion decreases progressively.

10. A polarizer comprising the light diffusion film according to claim 9, wherein the polarizer further comprises a substrate, a polarizing functional layer, and a hard coating, the substrate is disposed between the polarizing functional layer and the hard coating, and the resin layer is any one of the substrate, the polarizing functional layer and the hard coating.

11. The polarizer of claim 10, wherein the plurality of first particles and the plurality of second particles are directionally disposed in the resin layer, an included angle between a longitudinal direction of the plurality of first particles and an absorption axis of the polarizing functional layer ranges from −10 degrees to 10 degrees, and an included angle between a longitudinal direction of the plurality of second particles and absorption axis of the polarizing functional layer ranges from −10 degrees to 10 degrees.

12. The polarizer according to claim 10, wherein each of the plurality of second particles further comprises a first body portion, a second body portion and an intermediate portion, and the second body portion, the intermediate portion, and the first body portion are sequentially connected;

in a direction from the second end portion to the first end portion, a diameter of the intermediate portion remains unchanged, and a diameter of the second body portion remains unchanged, a diameter of the intermediate portion remains unchanged, and a diameter of the first body portion decreases progressively.

13. The light diffusion film according to claim 9, wherein each of the plurality of first particles has a diameter ranging from 0.008 microns to 12.4 microns, each of the plurality of second particles has a maximum diameter of 12.4 microns, and each of the plurality of second particles has a minimum diameter of 0.008 microns.

14. The light diffusion film according to claim 9, wherein each of the plurality of first particles has a diameter ranging from 0.008 microns to 12.4 microns, each of the plurality of second particles has a maximum diameter of 12.4 microns, and each of the plurality of second particles has a minimum diameter of 0.008 microns.

15. The light diffusion film according to claim 9, wherein each of the plurality of first particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of first particles is one or more organic particles selected from polymethylmethacrylate particles, polystyrene particles, polycarbonate particles, silicone elastomer particles, butyl acrylate-styrene particles, and poly (methyl 4-hydroxybenzoate) particles; and each of the plurality of second particles is one or more inorganic particles selected from calcium carbonate particles, calcium sulfate particles, calcium chloride particles, calcium oxalate particles, magnesium chloride particles, magnesium carbonate particles, magnesium sulfate particles, barium carbonate particles, barium sulfate particles, barium chloride particles, titanium dioxide particles, and zinc oxide particles, or each of the plurality of second particles is one or more organic particles selected from polymethylmethacrylate particles, polystyrene particles, polycarbonate particles, silicone elastomer particles, butyl acrylate-styrene particles, and poly (methyl 4-hydroxybenzoate) particles.

16. A light diffusion film comprising a resin layer, and a plurality of first particles and a plurality of second particles disposed in the resin layer; wherein each of the plurality of first particles has a diameter remaining unchanged in a longitudinal direction of the plurality of first particles;

the plurality of second particles comprise third particles and fourth particles, each of the third particles comprises a first end portion and a second end portion in a longitudinal direction thereof, and each of the fourth particles comprises a first end portion and a second end portion in a longitudinal direction thereof;

a diameter of each of the third particles decreases progressively in a direction from the second end portion of third particles to the first end portion of the third particles;

a diameter of each of the fourth particles increases firstly and then decreases in a direction from the second end portion of the fourth particles to the first end portion of the fourth particles;

each of the fourth particles further comprises an intermediate portion, the first end portion of the fourth particles, the intermediate portion of the fourth particles, and the second end portion of the fourth particles are sequentially connected, and a diameter of the intermediate portion of the fourth particles remains unchanged in a longitudinal direction of the fourth particles; and a ratio of a mass of all the plurality of first particles, a mass of all the third particles and a mass of all the fourth particles is (1 to 10):(40 to 70):(20 to 60).

17. The light diffusion film according to claim 16, wherein a sum of a mass of the plurality of first particles and a mass of the plurality of second particles accounts for 10% of a mass of the light diffusion film.

* * * * *